United States Patent
Xu et al.

(10) Patent No.: US 9,092,842 B2
(45) Date of Patent: Jul. 28, 2015

(54) SYSTEM FOR DEFECT DETECTION AND REPAIR

(75) Inventors: Xinyu Xu, Vancouver, WA (US); Chang Yuan, Vancouver, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 918 days.

(21) Appl. No.: 13/197,866

(22) Filed: Aug. 4, 2011

(65) Prior Publication Data

US 2013/0034293 A1    Feb. 7, 2013

(51) Int. Cl.
*G06T 7/00* (2006.01)

(52) U.S. Cl.
CPC ........ *G06T 7/001* (2013.01); *G06T 2207/20224* (2013.01); *G06T 2207/30121* (2013.01); *G06T 2207/30141* (2013.01)

(58) Field of Classification Search
CPC ............. G06T 2207/30148; G06T 7/001; G06T 7/0004; G06T 2207/30121; G06T 2207/1056; G06T 2207/10061; G06T 2207/30141; G06T 2207/30164; G06T 2207/3121; G06T 1/0007; G06T 7/0002; G01N 21/9501; G01N 21/95607; G01N 21/956; G01N 2021/9513; G01N 21/95676; G01N 2021/8854; G01N 2021/8861; G01N 2021/8864; G01L 22/12; G01J 2237/2817; H01J 37/28; H01J 2237/24592; G01R 31/311; G01R 31/2805; G03F 1/70; G03F 1/84; G03F 7/065; H01L 22/12; G02F 1/1303; G02F 1/1309; G02F 1/136259; G02F 2001/136254; G09G 3/006

USPC .................................................. 382/141, 152
See application file for complete search history.

(56) References Cited

U.S. PATENT DOCUMENTS

| | | | |
|---|---|---|---|
| 6,356,300 | B1 | 3/2002 | Shiba |
| 6,466,882 | B1 | 10/2002 | Kang et al. |
| 7,003,146 | B2 | 2/2006 | Eck et al. |
| 7,034,298 | B2 | 4/2006 | Miyai et al. |
| 7,084,970 | B2 | 8/2006 | Weiss et al. |
| 7,196,785 | B2 | 3/2007 | Nishiyama |
| 7,206,443 | B1* | 4/2007 | Duvdevani et al. ........... 382/149 |
| 7,330,581 | B2 | 2/2008 | Ishikawa |
| 7,425,704 | B2 | 9/2008 | Miyai et al. |
| 7,761,182 | B2 | 7/2010 | Gallarda et al. |
| 2004/0009413 | A1* | 1/2004 | Lizotte .............................. 430/5 |
| 2005/0254699 | A1* | 11/2005 | Sano et al. .................... 382/149 |
| 2007/0092128 | A1 | 4/2007 | Noy et al. |
| 2009/0136117 | A1 | 5/2009 | Barkol et al. |
| 2009/0180679 | A1* | 7/2009 | Hackney et al. ............... 382/141 |
| 2010/0303334 | A1* | 12/2010 | Kitamura et al. ............. 382/141 |

\* cited by examiner

*Primary Examiner* — Edward Park
(74) *Attorney, Agent, or Firm* — Chernoff Vilhauer McClung & Stenzel, LLP

(57) ABSTRACT

A system for identifying a repair cut location for a defect in a liquid crystal device includes receiving an input image, a defect mask image, and a landmark structure image. The system determines a repair cut location, based upon the input image, the defect mask image, and the landmark structure image, for a liquid crystal device proximate the defect. The determination may be based upon a type of said defect, a cause of said defect, a position of said defect, and a spatial relationship of the defect and a structure of the landmark image.

4 Claims, 25 Drawing Sheets

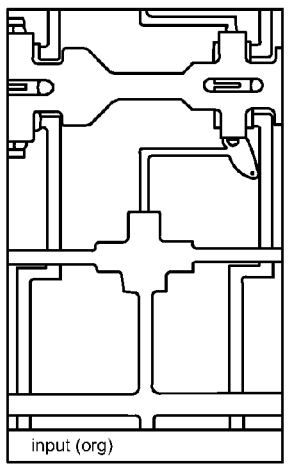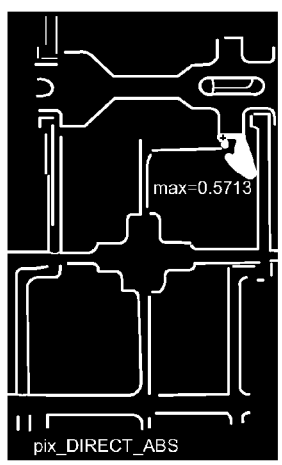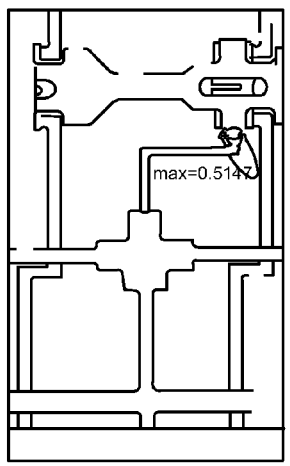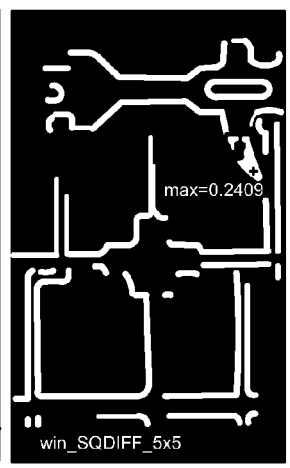
FIG. 17　　　FIG. 18　　　FIG.19

SYSTEM FOR DEFECT DETECTION AND REPAIR

CROSS-REFERENCE TO RELATED APPLICATIONS

None.

BACKGROUND OF THE INVENTION

The present invention relates to defect detection and repair of electronic devices.

The manufacturing of liquid crystal display involves using large thin glass plates for the deposition of multiple thin film transistor arrays thereon. In many cases, such as for active matrix liquid crystal displays, a transistor and/or diode is located at each of the pixels and/or sub-pixels of the display. The transistor and/or diode deposition is often performed by depositing multiple layers forming a stack of materials. The deposition technique includes a series of steps, such as deposition, masking, etching, stripping, etc.

During each of the steps used to fabricate the transistor and/or diode, production defects may occur that modify the electrical and/or optical characteristics of the resulting liquid crystal panel. For example, some defects may include metal protrusion into an indium-tin-oxide layer, indium-tin-oxide protrusion into a metal layer, an open circuit, a short circuit, and a piece of material missing.

The number of defects and the type of defects may significantly impact the yield of the resulting liquid crystal display, which results in an increasing price for a sufficiently defect free display. Typically, the thin film arrays (e.g., transistors and/or diodes and/or conductors, etc.) are inspected in some manner using an automated optical inspection system, and tested using some type of test fixture. Often the repair system is only semi-automatic requiring an operator to provide a judgment call for each of the defects. Unfortunately, such optical inspection systems have difficulty in suitably identifying the type of defects, those that are suitable for repair, and the suitable technique to repair the defect.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 17 illustrates direct pixel based comparison.
FIG. 18 illustrates local color difference map.
FIG. 19 illustrates local window based comparison.

DETAILED DESCRIPTION OF PREFERRED EMBODIMENT

Figure 1:
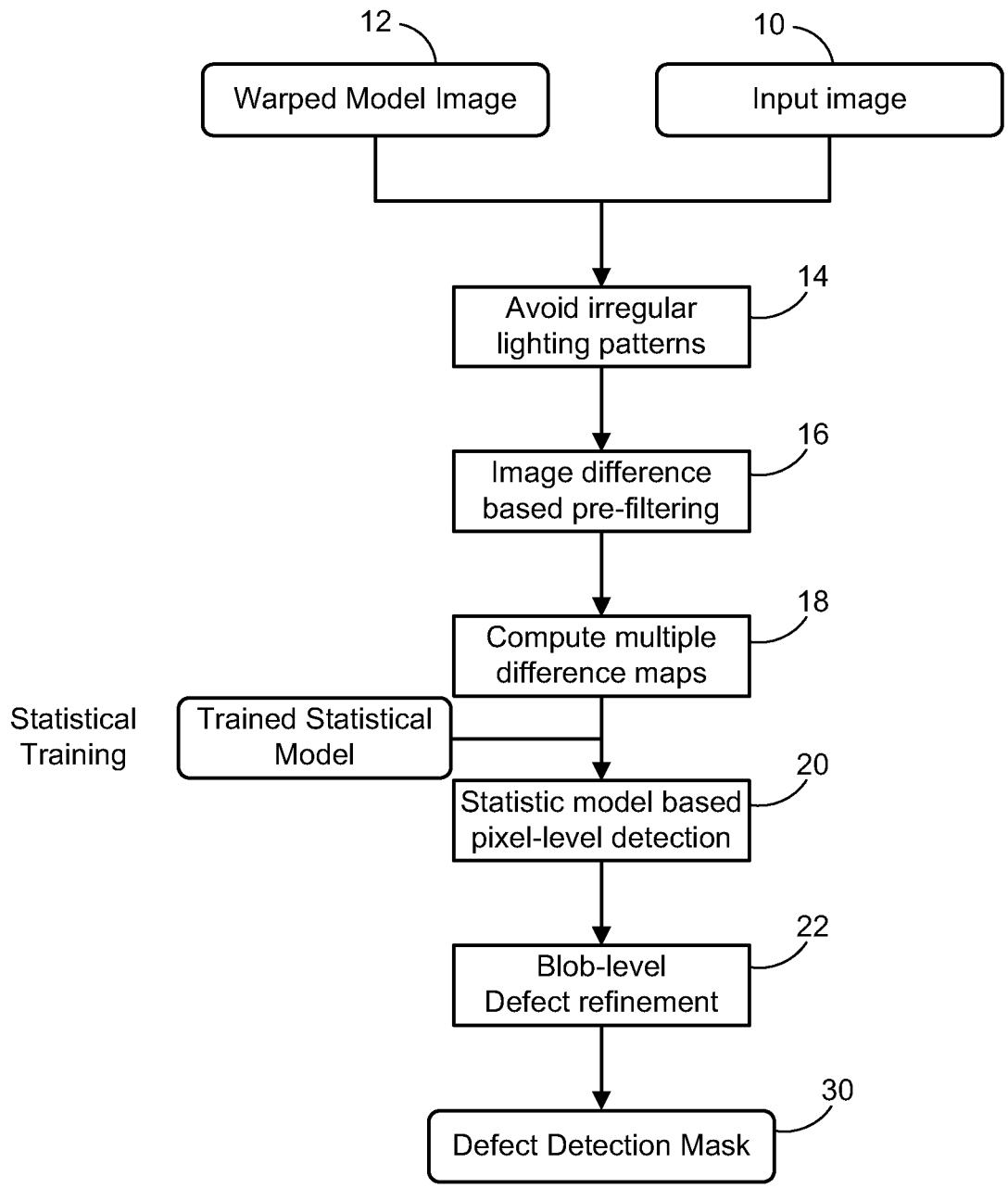
FIG. 1 illustrates a defect detection mask determination.

Referring to FIG. 1, one technique to analyze image content, especially suitable for a thin film layer of a liquid crystal display, is to determine a suitable defect detection mask 30. The system may receive an input image 10 and a model image 12. One or more images 10 are obtained of a region of the thin film layer using an imaging device. The received images tend to vary based upon a background coating in the sub-pixel regions of the thin film layer. Such variations may be observed as different lighting patterns and bubbles after being repaired. To more accurately determinate the defect detection mask 30, it is desirable that the effect of these color patterns are reduced to maintain sufficient defect detection accuracy.

Figure 2:
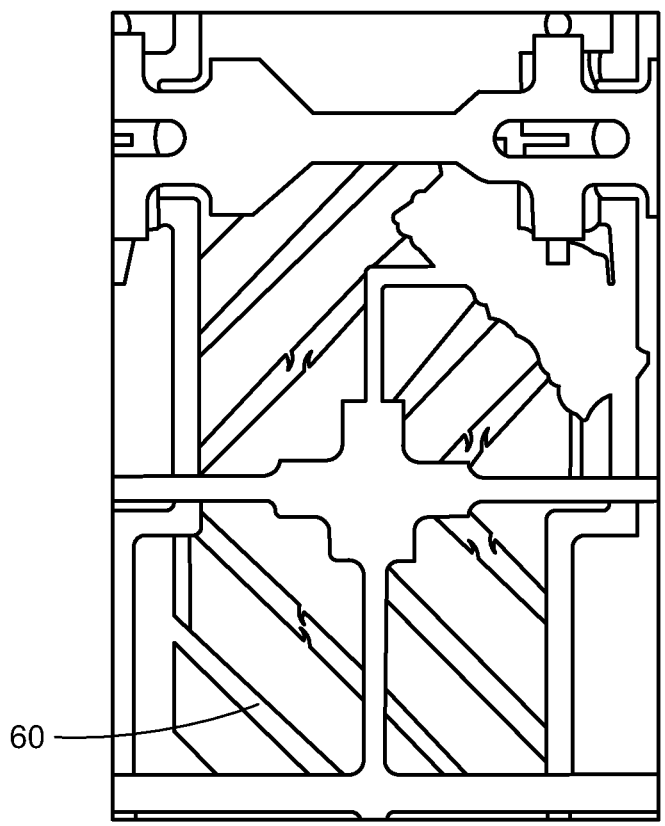
FIG. 2 illustrates a coating region with an irregular pattern.
Figure 3:
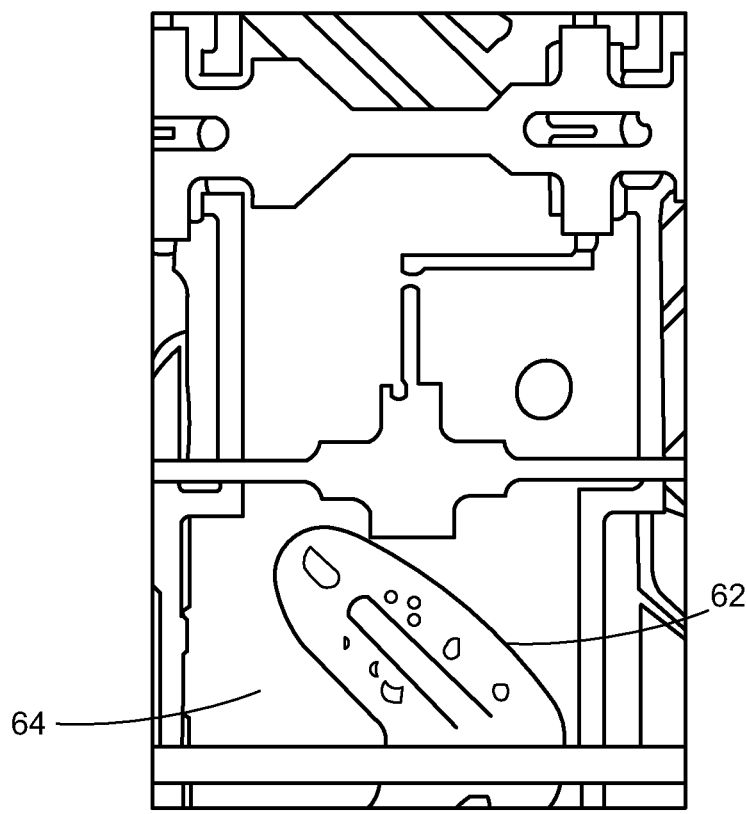
FIG. 3 illustrates a coating region with a portion appearing to include a bubble.

Referring to FIG. 2, a coating region 60 may have irregular color patterns. Such an irregular color pattern, such as red, green, blue, is different from the typical color of a defect. Referring to FIG. 3, a coating region 62 may have a bubble region 64 that has a different gray tone than the original background color. In either case, these regions should be identified and not substantially used (or otherwise not included) in computing the defect detection mask.

Figure 4:
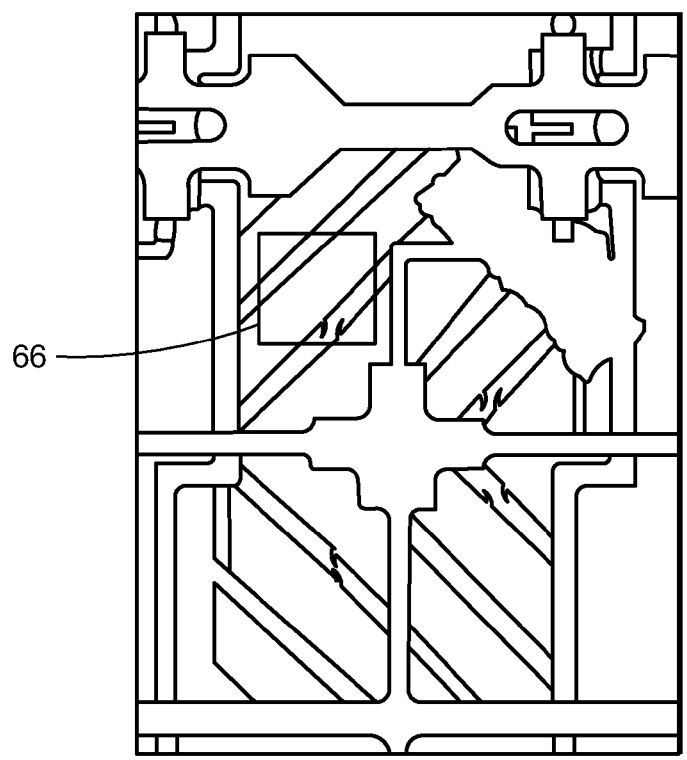
FIG. 4 illustrates a rectangular area defined within in a coating region.
Figure 5:
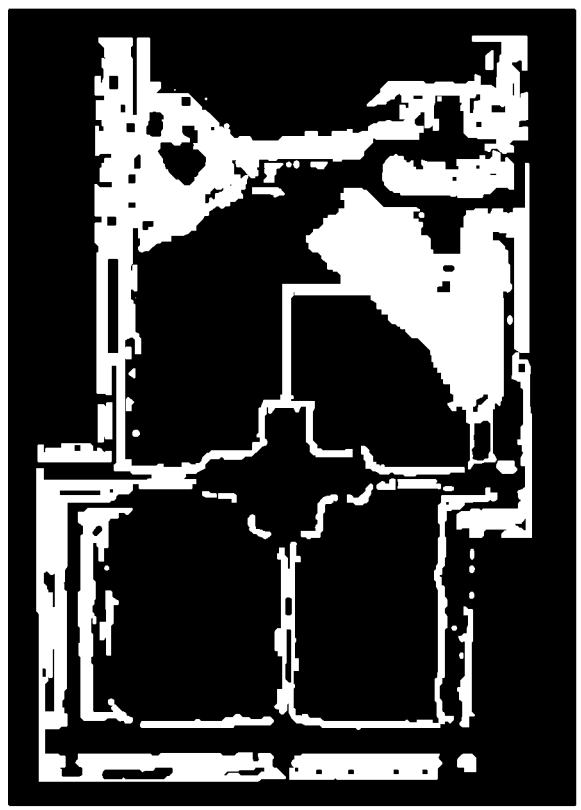
FIG. 5 illustrates a potential defect mask image.

Referring to FIG. 4, one technique to reduce the impact of such irregular lighting pattern type defects 14 (see FIG. 1) is to select one or more rectangles 66 in the region including the irregular color pattern. A statistical technique, such as a KMeans technique, may be used to determine the two primary colors within the rectangular region. This may include, for example, the pixel lighting color and/or the background gray color. Then the pixels whose colors are different form the two primary colors may be determined, such as using the following relationship: ||C−mean(C1)||>3sdv(C1). Referring to FIG. 5, the resulting regions of the image may be labeled as a potentially valid mask image that avoids irregular lighting patterns.

Figure 6:
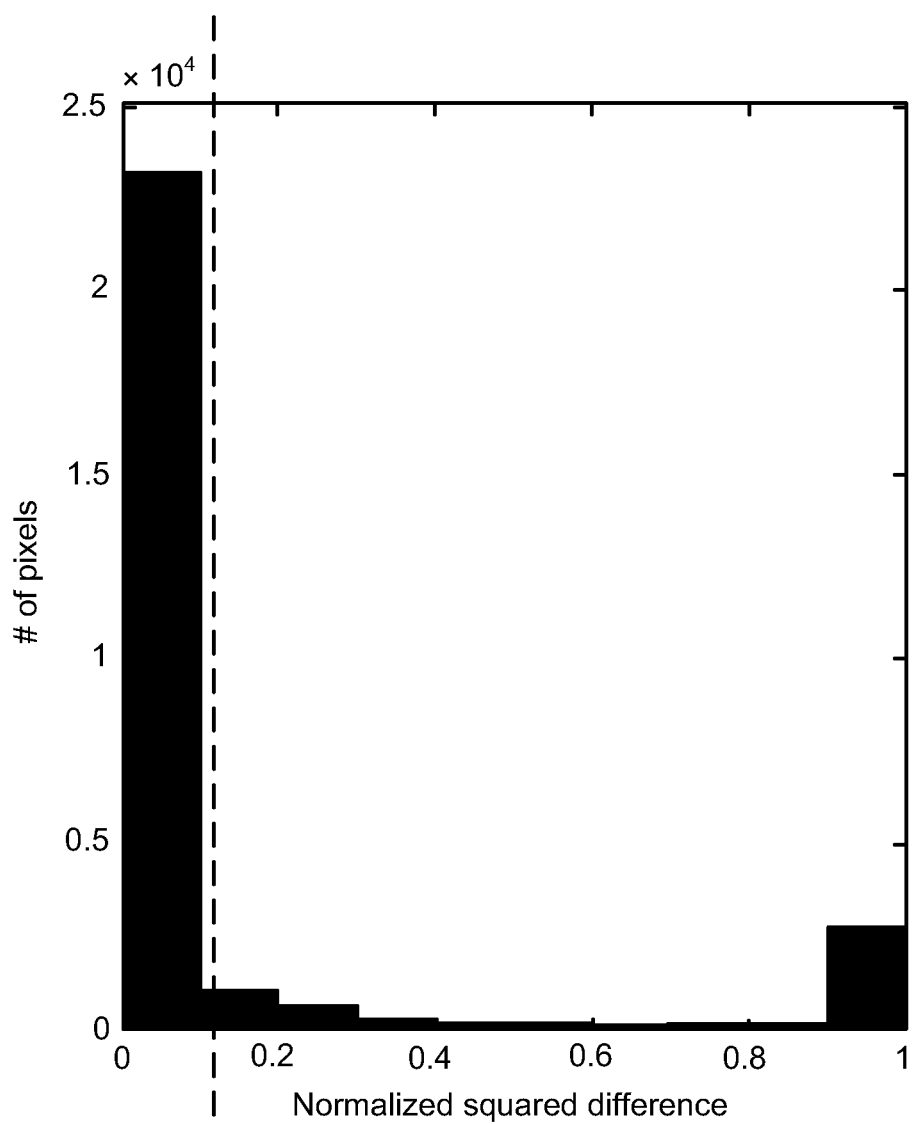
FIG. 6 illustrates normalized squared differences.

Referring again to FIG. 1, an image filtering technique may be used, such as an image difference based pre-filtering 16. The image difference based pre-filtering 16 may include computation of the squared difference between the model image 12 and one or more input images 10 or any other image comparison technique. Referring to FIG. 6, the differences may be based upon local windows, such as a 3×3 window, to increase computational efficiency. One suitable window based difference technique is using the following relationship:

$$\frac{\sum_{(x,y)\in W(x,y)} (I(x, y) - M(x, y))^2}{\sum_{(x,y)\in W(x,y)} I(x, y)^2}$$

where W(x,y) are the pixels in the local window, I are the pixels of the input image 10, and M are the pixels of the model image 12.

Figure 7:
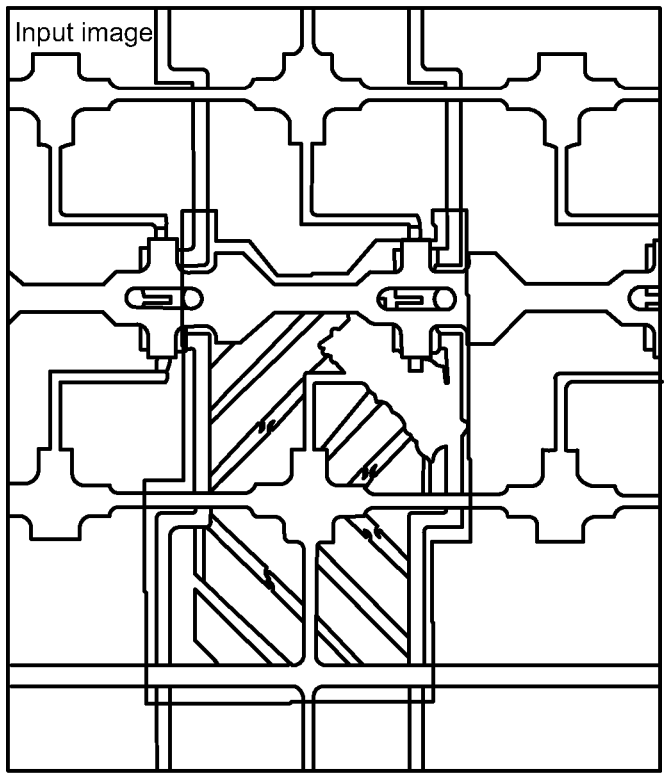
FIG. 7 illustrates a threshold applied to a difference in an input image.
Figure 8:
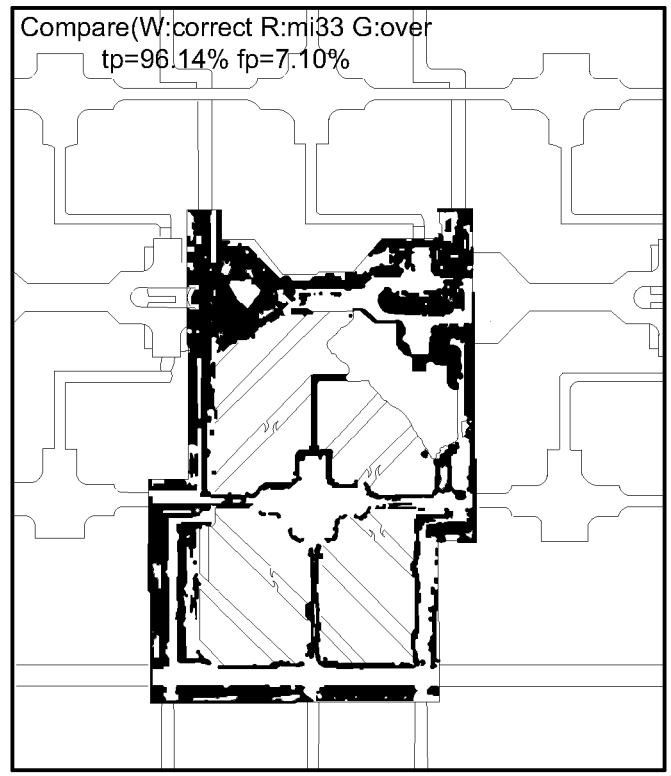
FIG. 8 illustrates pixels having a sufficient difference in FIG. 7.

A threshold may be applied to the differences in the input image (see FIG. 7), so that only pixels with a sufficiently large difference will be used for further detection (see FIG. 8). In this manner, the processing efficiency will be increased by skipping pixels with sufficiently small differences.

Referring again to FIG. 1, multiple difference maps 18 may be computed. The image comparison technique may compute the pixel color differences between the model and the input images. One technique uses a direct pixel based technique to determine pixel color differences and another technique uses local window based pixel color differences. The local window based pixel color differences technique tends to be more robust than direct pixel based difference technique.

By way of example, a local window based comparison technique may repeat the following process for each pixel position (x,y) of the image. This may involve extracting a local window around the model image pixel M(x,y); extracting a local window around the input image pixel I(x,y); and computing the difference between the two local windows in some manner, such as the sum of squared differences. The computational complexity largely depends on the image and window sizes: $O(W_{img}*H_{img}*W_{win}*H_{win})$.

A preferred window size is $W_{img}=H_{win}=5$. The following relationship may be used:

$$\sum_{(u,v)\in W(x,y)} (M(u, v) - I(u, v))^2$$

where W(x,y) are the pixels within the local window around (x,y).

Figure 9:
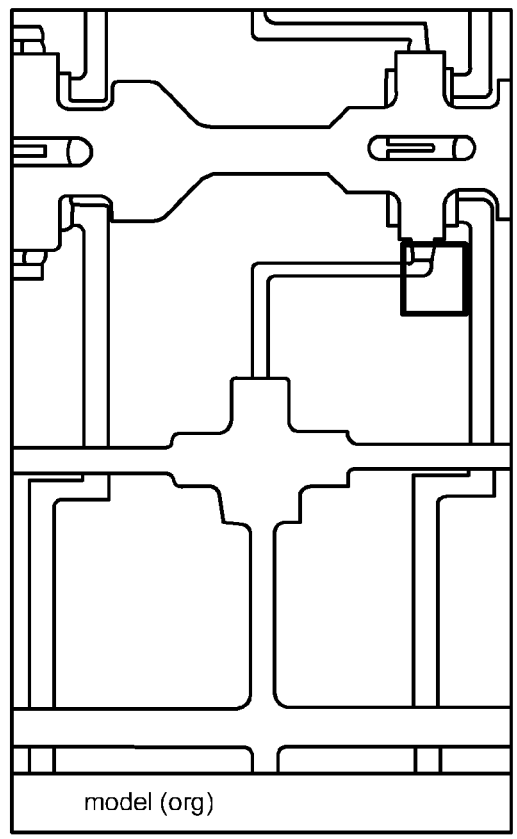
FIG. 9 illustrates an exemplary model image.
Figure 10:
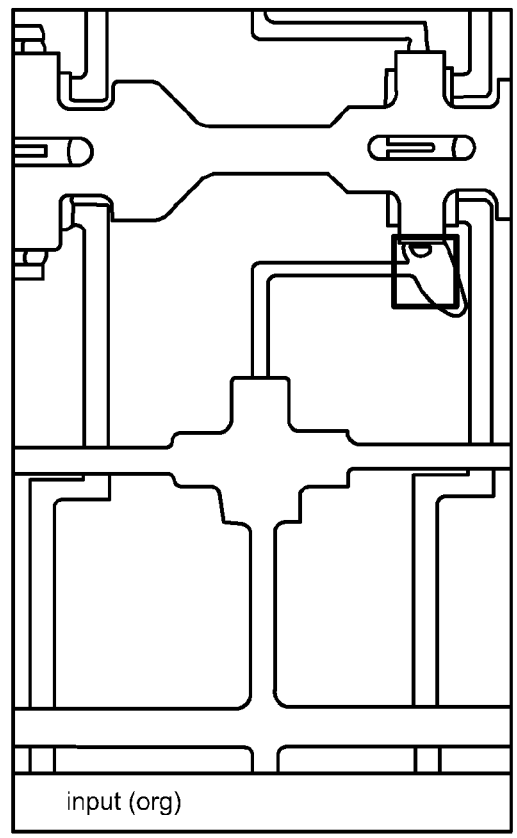
FIG. 10 illustrates an exemplary input image.
Figure 11:
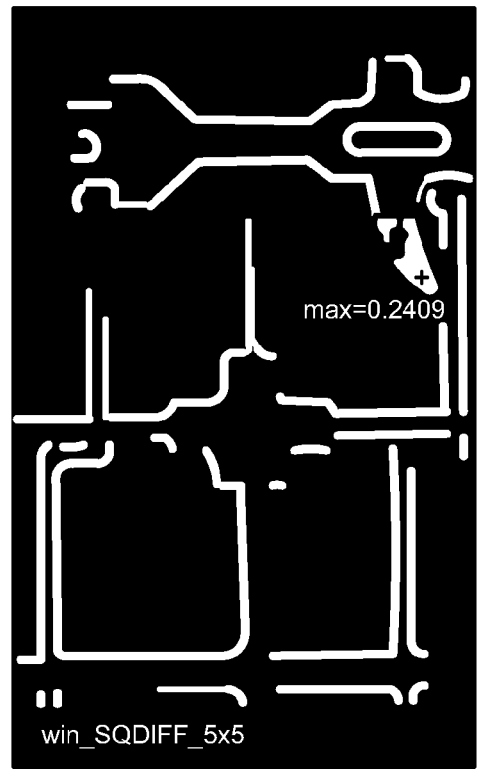
FIG. 11 illustrates areas of potential interest.

An exemplary model image is illustrated in FIG. 9, while an exemplary input image is illustrated in FIG. 10. The result of the computation is illustrated in FIG. 11, which identifies the areas of potential interest.

One technique to improve the computational efficiency is to use an integral image (summed area table). Each pixel in the integral image stores the value summed from the top left corner. As such, the window may be decomposed into three parts. First, a summed square of the model image "M". Second, a summed square of the input image "I". Third, a summed correlation of the model and input image "MI". The relationship may be as follows:

$$\sum_{(u,v)} (M(u, v) - I(u, v))^2 = \sum_{(u,v)} M^2(u, v) + \sum_{(u,v)} I^2(u, v) - 2\sum_{(u,v)} MI(u, v)$$

Based on the integral images, each local window based comparison may be converted into 12 additions, independent of the local window size. In this manner, the computational complexity may be reduced to $O(W_{img}*H_{img})$, which is independent on the window size. For example, the reduction in processing time may be 20+ times faster, in addition to being suitable for parallel processing techniques.

The identification of defects may be based, at least in part, on the identification of irregular colored regions in the input image. The criteria for determining such irregular colored regions may include the following. First, defective areas tend to have different colors between the model image and the input image. Second, the defective areas tend to have irregular regions on conductive lines. For example, a region with color variations on one or more source lines is more likely to be a defect than one in the background area. For example, a landmark label image (where regions of the image are identified) may be used to characterize this criteria. Third, defective areas tend to have different colors from their neighboring pixels in the input image. For example, a local color difference may be used for this criteria.

In the process of determining model images, the system may use different labeled landmark regions in the model image. For example, the system may have background areas, gate areas, N+ layer, source lines, gate lines, Cs lines, etc. For example, the identification of these different types of regions may be used to determine whether a detected difference is a defect. For example, a variation in the background area may not be considered a defect while the same variation on the source line is more likely to be considered a defect.

Figure 12:
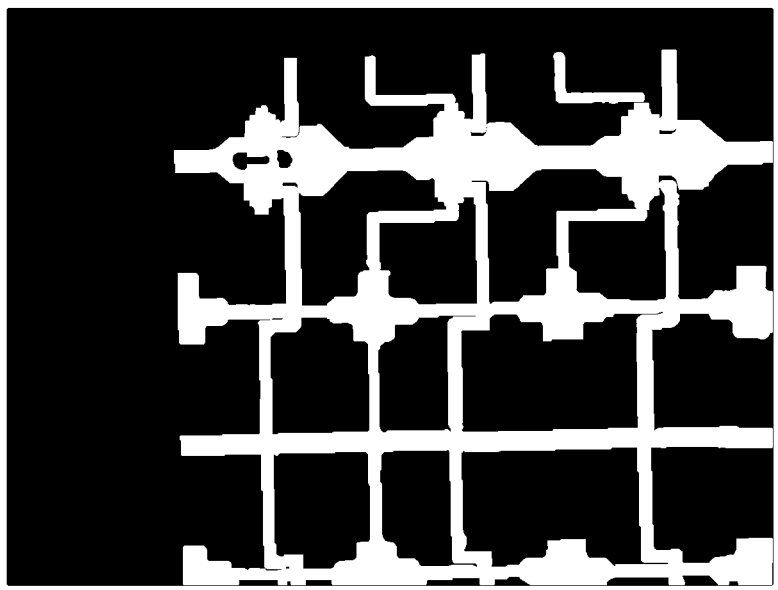
FIG. 12 illustrates a landmark label image.
Figure 13:
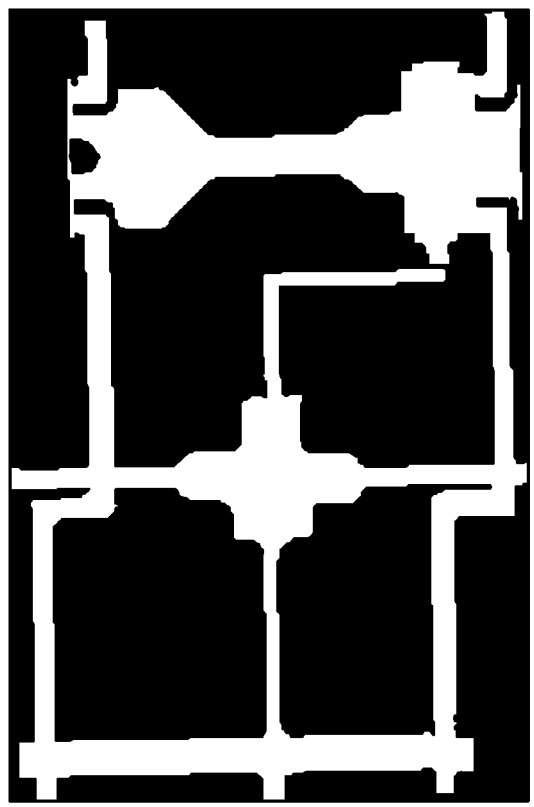
FIG. 13 illustrates an inter-image transform.

The combination of the color difference and the landmark labels provides improved defect detection. A statistical model 20 (see FIG. 1) may be used in the training process to assist in the finding an appropriate combination. Referring to FIG. 12, the landmark label image for the training process is shown. Referring to FIG. 13, the technique may use an inter-image transform (estimated in the image alignment stage) to warp the original landmark label image to the input image coordinates so the images are aligned with one another. Then the warped landmark label image is intersected with the region of interest area in the input image. Then the edge areas of the landmark label image may be refined so that the pixels with similar colors share the same label.

In many cases, the pixel patterns tend to change in the input image even if there are no defects due to manufacturing variations, such as the width of the gate or the width of lines. In addition, the input image alignment is typically not perfectly registered with the model. To simplify the determination of defects, each of the landmark regions (e.g., background areas, source lines, gate lines, etc.) may be considered to have a uniform color. Thus, pixels may be compared to their adjacent pixels in the same landmark region to determine pixels with sufficiently different colors.

Figure 14:
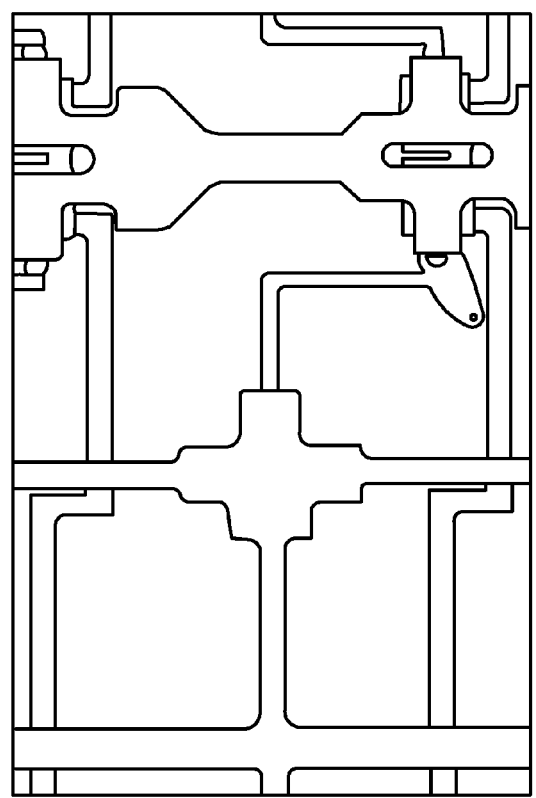
FIG. 14 illustrates a landmark label image.
Figure 15:
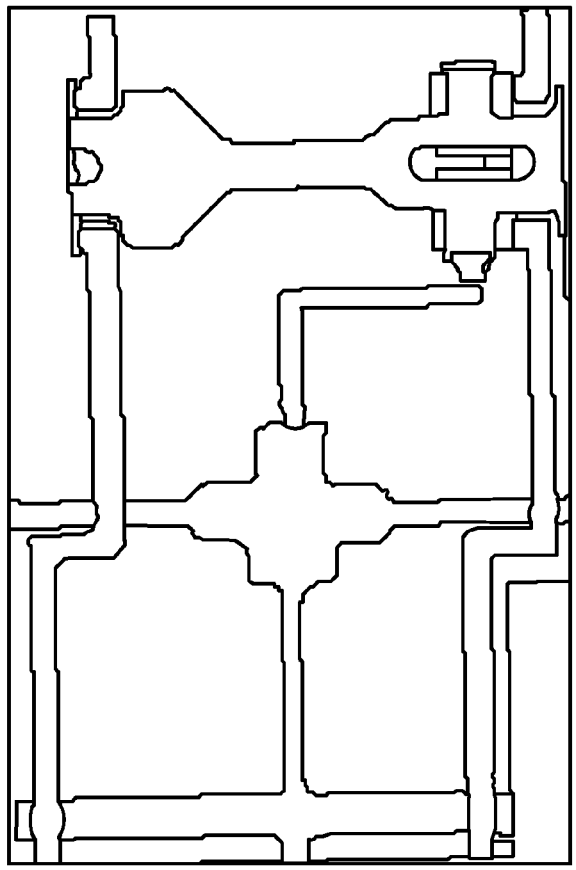
FIG. 15 illustrates an input color image.
Figure 16:
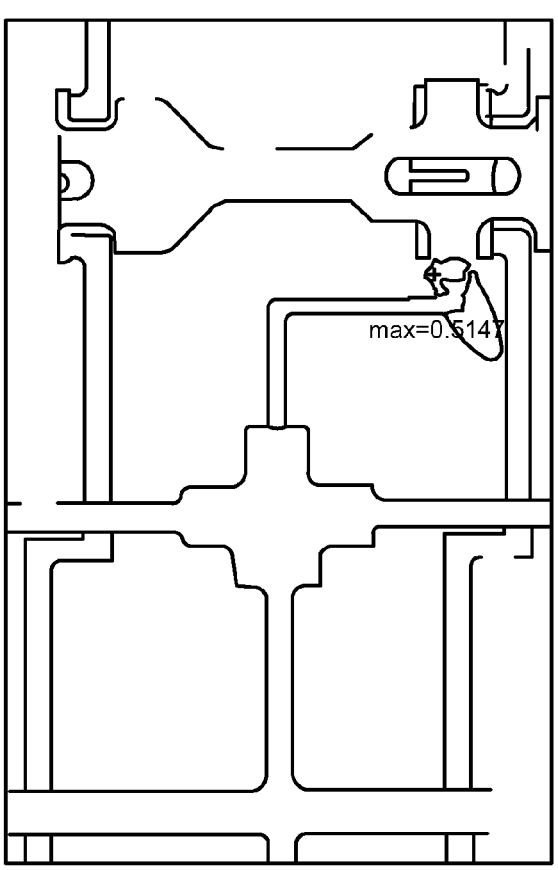
FIG. 16 illustrates a local color differences map.

One technique to compute the local color difference maps is to overlay the landmark label image (see FIG. 14) with the input color image (see FIG. 15). Then, the major color for each landmark region is determined, such as using a K-Means to segment all the pixels in the landmark region into two color clusters (in the red-green-blue color space). If the centers of the two clusters are sufficiently close together, then compute the major color as the average of the two centers. Otherwise, select the center of the cluster with the greater number of pixels. This handles the situation where the defects with different colors are present. For each pixel, subtract its color value from the major color in the corresponding landmark region, resulting in a local color difference map (see FIG. 16).

For each pixel, a high dimensional (e.g., 63) input vectors may be extracted for each image pixel, based upon the use of local windows drawn from various difference maps to increase coherence between adjacent pixels. To reduce the computational complexity of the system, a lower dimensional vector may be used for the image pixels. To preserve the coherence between adjacent pixels, the difference maps may be smoothed (such as a 3×3 Guassian smoothing filter) before being used as input feature vectors. For example, the difference maps may contribute 3 dimensions to the input vectors. The first dimension may be a direct pixel based comparison (see FIG. 17). The second dimension may be a local color difference map (see FIG. 18). The third dimension may be a local window based comparison (see FIG. 19).

Figure 20:
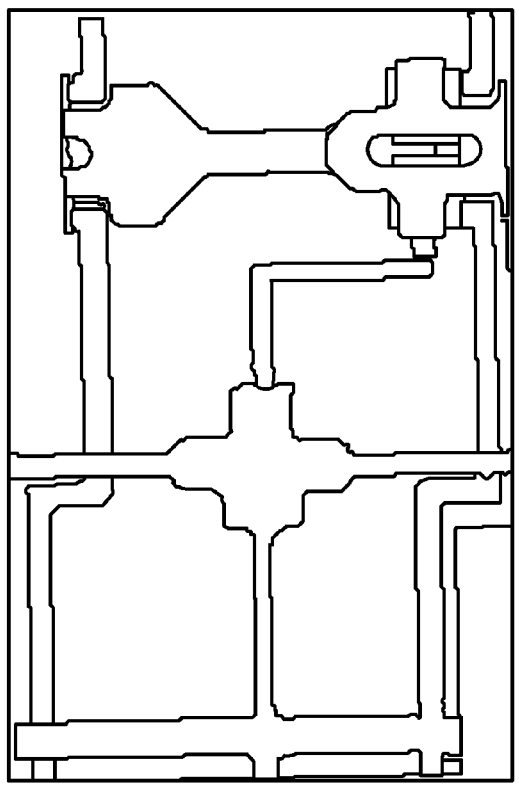
FIG. 20 illustrates a landmark label image.
Figure 21:
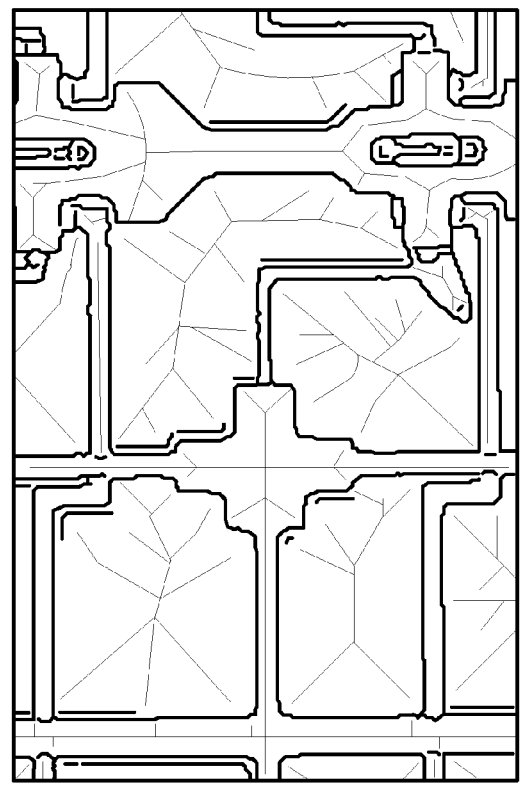
FIG. 21 illustrates distance to image edges.
Figure 22:
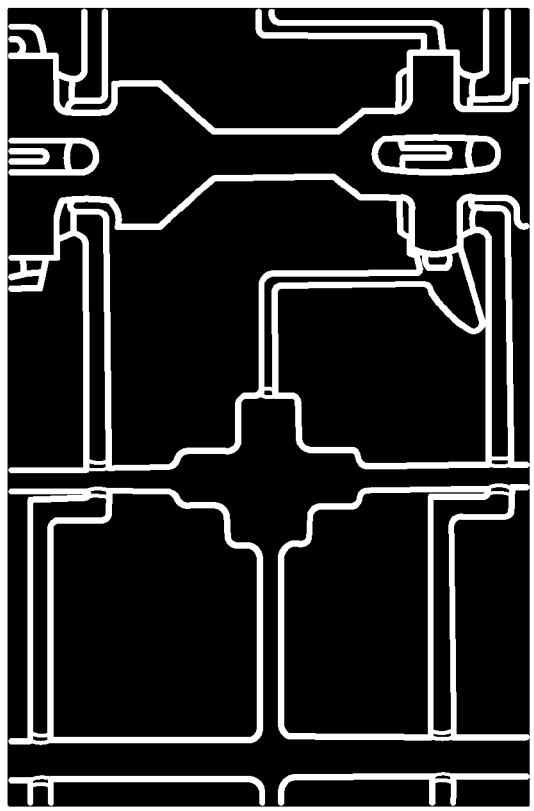
FIG. 22 illustrates image gradient magnitudes.
Figure 23:
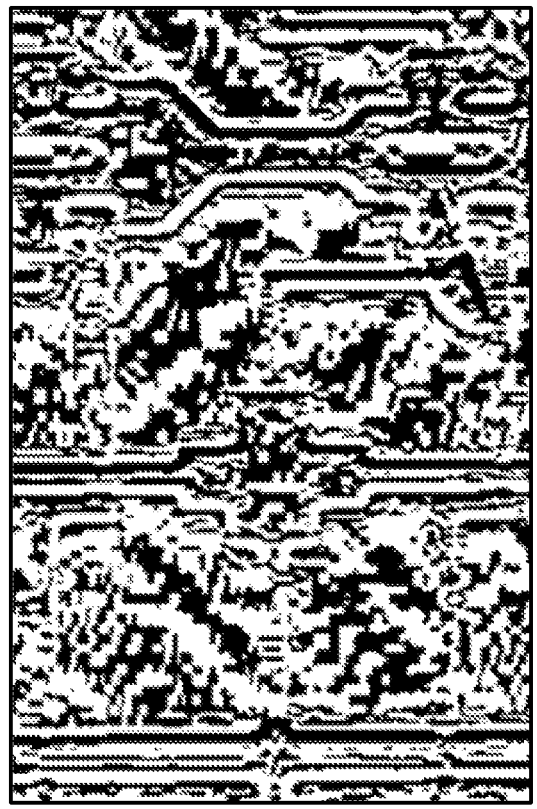
FIG. 23 illustrates image gradient orientations.

Other features may be used to contribute an additional four dimensions, each of which may be computed based upon the input image without making a comparison to the model image. The fourth dimension may be a landmark label image (see FIG. 20). The fifth dimension may be a distance to image edges (see FIG. 21). The sixth dimension may be an image gradient magnitude (see FIG. 22). The seventh dimension may be an image gradient orientation (see FIG. 23).

An improved defect mask refinement technique 22 (see FIG. 1) may be performed by utilizing the predicted output image by the defect model and landmark label images. The predicted output from statistical models 20 is usually a continuous number from −1 to 1, so in essence the value includes information related to confidence. The refinement technique may search for all of the blobs in the defect mask image. If the size of a blob is larger than a threshold (e.g., such as four), then it may be treated as a valid defect. Otherwise, one may consider one or more of the following factors. A first factor is if the average predicted output is smaller than a threshold (e.g., such as 0.1) then reject it. A second factor is if the blob has a small difference from the model image and does not overlap on the source line, then reject it. A third factor is if there are other scattered blobs around the current blob, then treat them as one and repeat the above decision process.

A sample subset may be created for each input image. Each sample may consist of an input feature vector and a "ground truth" output, such as 1 for defect and −1 for non-defect. The samples may be stored to reduce the memory requirements, and loaded when necessary such that only one subset is kept in memory at any particular time. The accuracy of each subset is computed: true positive rate; false positive rate.

The system may build a list of subsets by combining subsets for all images, which permits better management of sample sets. For example, if needed, only use the subsets for a certain type of images or if the detection result for one subset is not good, add more samples in the subset for training.

The system should also facilitate both batch and incremental training of the reference data. One way of facilitating this is to use a statistical model that supports both types of training, such as single decision trees and boosted decision trees.

The batch training may be based upon sample subsets for all input images which are stored. Then each subset may be split into training and testing sub-subsets. Load the samples from all training sub-subsets into memory. Thus the statistical model may be trained based on these samples. Verification of the data may be done by testing the model on the samples from testing sub-subsets.

The incremental training may be based upon creating a sample subset for the new input image. To perform this, the subset may be split into training and testing sub-subsets or use the whole subset for training. The training samples may be used to update the current model. The previous training samples may not be needed. If desired, previous models may be saved with a timestamp, so if the newly trained model does not work well, the system may be rolled back.

In some cases, the system may compute a score s (between 0 and 1) to evaluate the results of the detection. The higher the score, the greater likelihood of a defect.

If s>0, the detection is successful and the value s reflects how successful it is. If s=0, the detection has failed (over-detection or miss-detection). The score s may be computed by comparing the predicted (PRED) defect mask image with the ground-truth (GT) defect mask image. Computing a score for s may be based upon PRED empty and GT empty→correct detection (s=1)
PRED empty and GT not empty→miss detection (s=0)
PRED not empty and GT empty→over detection (s=0)
Overlap the blobs in PRED and GT:
If a PRED blob is not found in GT→over detection (s=0)
Otherwise compute the ratio of overlap area over the total area (a number between 0 and 1).

The image-level score may also used in the training process. The previous criterion for selecting the best trained model is based on a pixel-level measure. The criterion may also be the average image-level score which is suitable for online/incremental training process. The percentage of successful images (s>0): suited for batch training (as used in this delivery)

$$\frac{\text{\# of successful images}}{\text{\# of all images}} \times 100\%.$$

As previously described, automatic defect repair for a liquid crystal panel may include an input image and a landmark mask image (segmented from the model image) and a detected defect mask. A decision tree may be used for a laser repair technique based on the type of defect (source-drain leak, gate-drain leak, etc.), defect cause (coat and/or foreign substance), defect position, and spatial relationship between defect and landmark. Based upon this criteria a suitable repair technique may be used, such as using one or more laser cuts including adjusted drain cut, adjusted source cut, adjusted coat trimming, adjusted drain cut for CGD coat, adjusted wide drain cut, etc.

One or more decision trees may be used based on defect type, one for repairing source-drain defect, the other for repairing gate-drain defect. The nodes of the decision tree may include defect visibility, defect type, defect cause, defect connectivity with landmarks. The leaf nodes output, for example, the repair type including drain line cut, source line cut, coat trimming and wide drain cut. The decision rules may be derived from domain knowledge of the human operator in repairing the defects. The repair rules may be automatically or semi-automatically improved/adapted over time, incorporating lessons learned by operators while repairing defect types and defect causes.

The advantages may include:
(1) The repair method makes use of defect location and size to avoid hitting a defect;
(2) The repair method decides proper laser shooting position and laser cut size based on defect type and defect cause;
(3) The repair method decides proper laser shooting position and laser cut size by analyzing the spatial relationship between landmarks (e.g. source and gate line in LCD panel) and defects (e.g. defect is connected to landmark, defect overlaps with landmark) to avoid hitting unintended structures;
(4) The repair method automatically determines the orientation of the laser cut rectangle based on the orientation (horizontal or vertical) of the landmarks;
(5) The repair method is robust to variations of product structure, defect shape, geometry, and/or imaging conditions;
(6) A pool of candidate laser cut positions are obtained, and the laser cut that is close to the defect selected; and/or
(7) Adaptively compute the width of the laser cut based on defect width and landmark line width.

Figure 24:
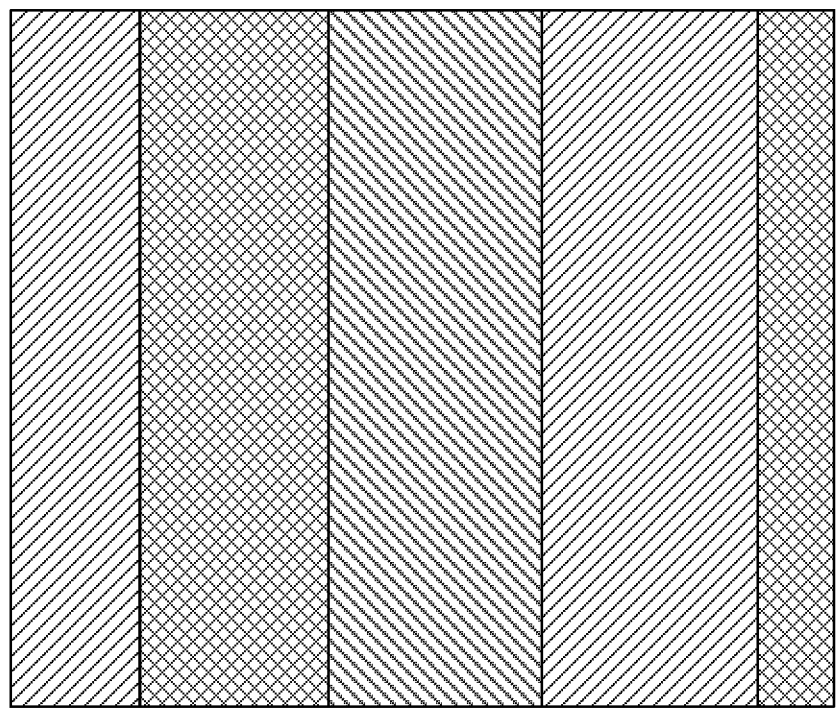
FIG. 24 illustrates a set of liquid crystal pixels.
Figure 25:
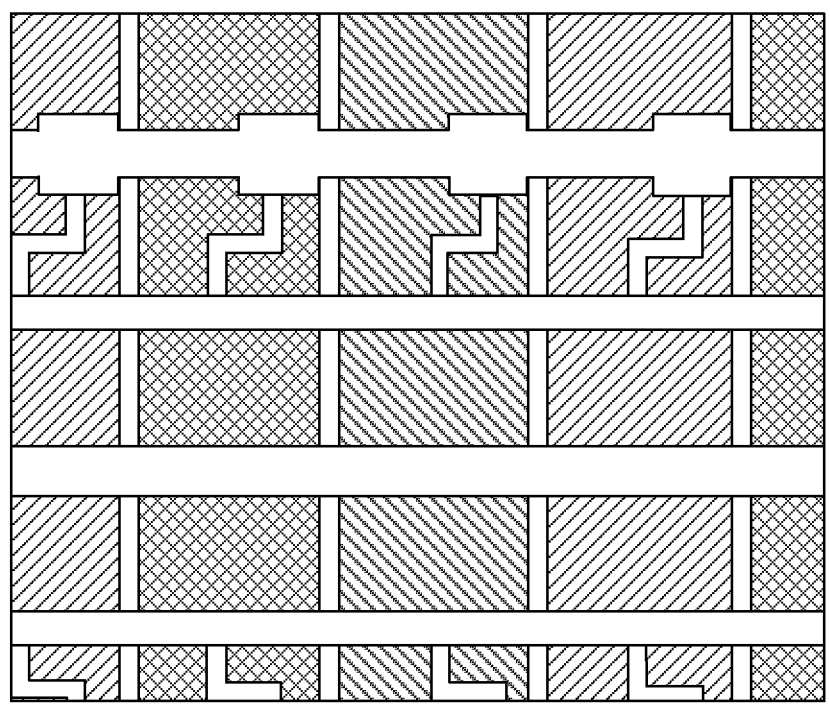
FIG. 25 illustrates pixel patterns with driving lines.
Figure 26:
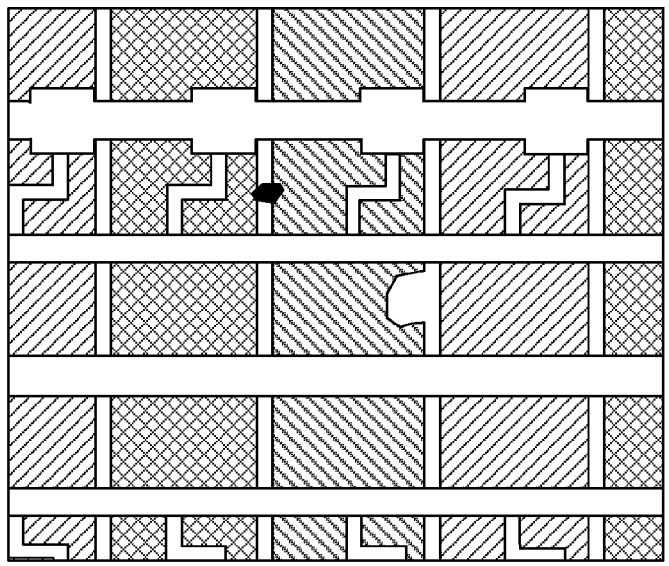
FIG. 26 illustrates pixel patterns with driving lines and a foreign substance defect and a coat defect.

Referring to FIG. 24, a set of liquid crystal pixels is illustrated, which in this case is generally a set of colored strips of red, green, and blue. FIG. 25 illustrates the pixel pattern of FIG. 24 together with the driving lines for the liquid crystal. Referring to FIG. 26, the pixel pattern with driving lines of FIG. 25 is illustrated with a foreign substance defect and a coat defect.

Figure 27:
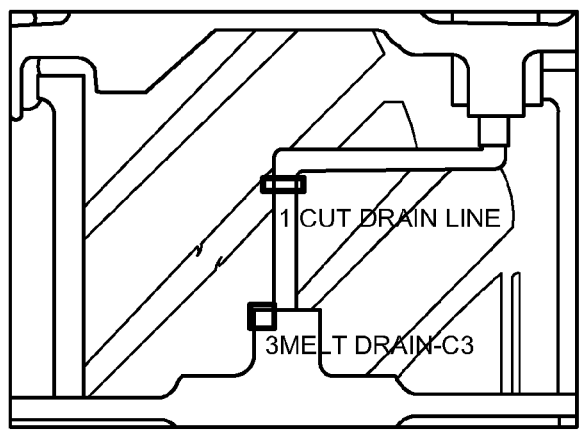
FIG. 27 illustrates a cutting technique.

There are several different techniques that may be used to attempt to repair the display. Referring to FIG. 27, a default technique is to cut a rectangle out of the drain line. In this manner, if a defect exists severing the electrical connection will result in disabling the pixel, which results in a black pixel which is generally not noticeable by a viewer. Another technique is to "melt" a section of the drain-collector area to effectively disable the pixel, which results in a black pixel which is generally not noticeable by a viewer.

Figure 28:
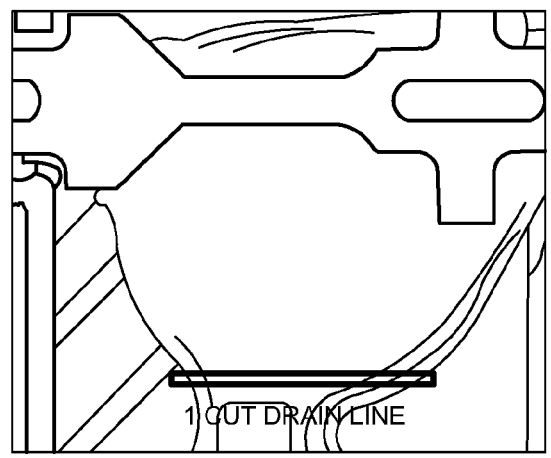
FIG. 28 illustrates an adjusted drain cut.
Figure 29:
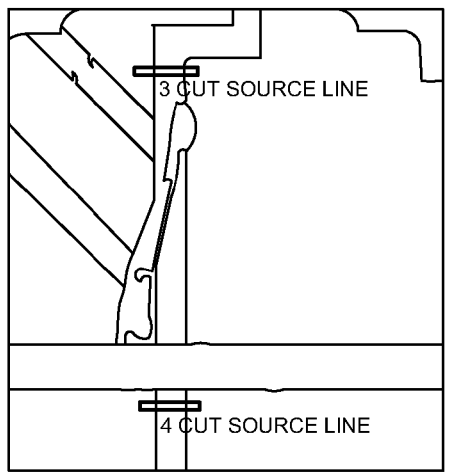
FIG. 29 illustrates a source cut.
Figure 30:
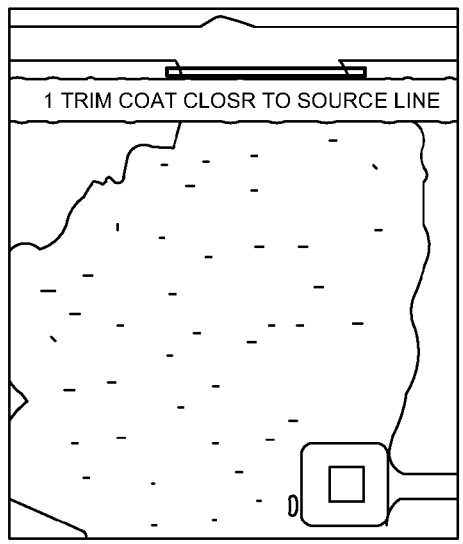
FIG. 30 illustrates a coat trimming cut.
Figure 31:
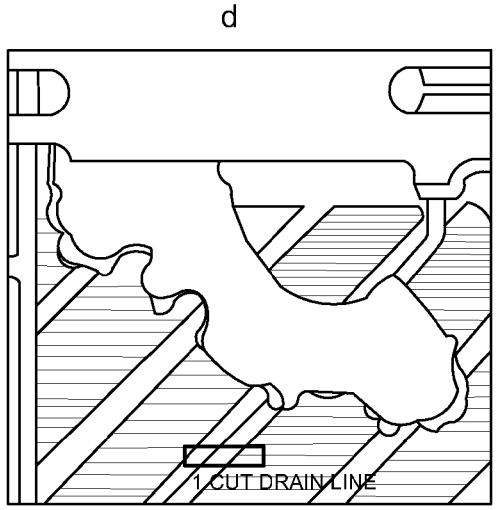
FIG. 31 illustrates a drain cut for the collector gate drain coat.
Figure 32:
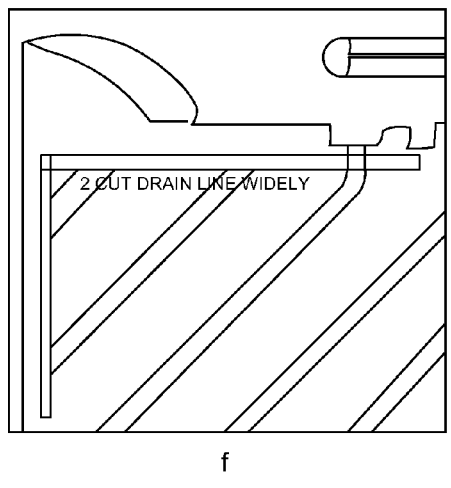
FIG. 32 illustrates a bi-direction wide drain cut.

An alternative technique may be based upon both the position and size of the defect relative to a landmark. Referring to FIG. 28, an adjusted drain cut may be based upon a relatively large conductive drain region, where a cut is made across the drain region. Referring to FIG. 29, a source cut may be used to reduce the effects of additional conductive material. The location of the source cut is preferably selected so that additional conductive material does not go around the cut, thereby rendering the attempted repair ineffective. Referring to FIG. 30, a coat trimming cut may be made to effectively disable the pixel. Referring to FIG. 31, a drain cut for the collector-gate-drain coat may be made to eliminate the effects of the overlapping coat. Referring to FIG. 32, a bi-directional wide drain cut may be made to effectively remove electrical interconnections.

Figure 34:
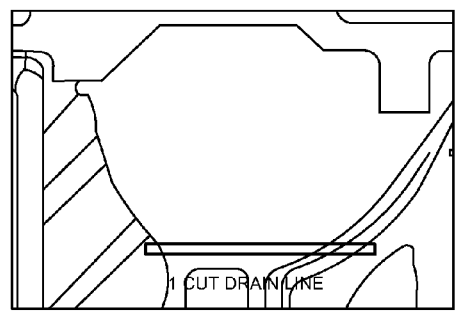
FIG. 34 illustrates a totally covered drain line.
Figure 33:
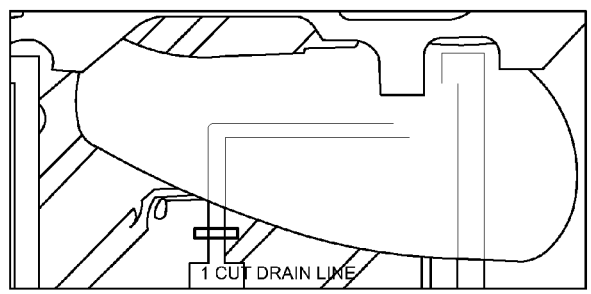
FIG. 33 illustrates a non-totally covered drain line.

The different techniques accommodate the different types of defects by adjustments to the cut positions. Referring to FIG. 33 for example, when the drain line is not totally covered by a coat defect a relatively small cut may be used. Referring to FIG. 34, for example when the drain line is totally covered by a coat defect, it is desirable to determine a drain cut rectangle with a generally minimum cut length. For example, when the drain line is totally covered by some defects, such as a foreign substance defect, the system may determine if it can construct valid drain cut.

Figure 35:
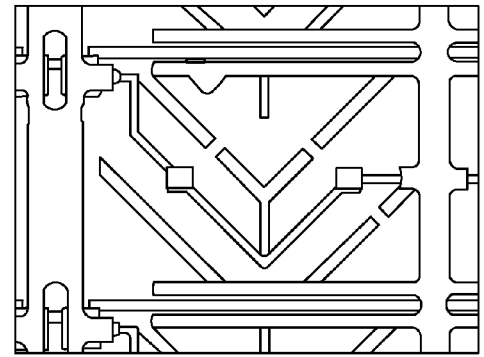
FIG. 35 illustrates horizontal lines.
Figure 36:
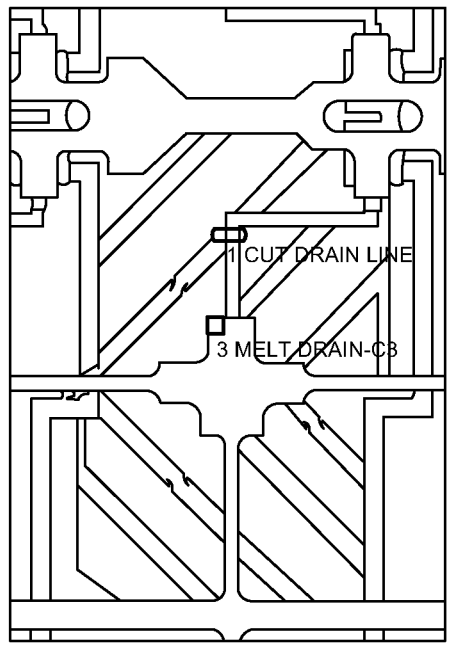
FIG. 36 illustrates vertical lines.
Figure 37:
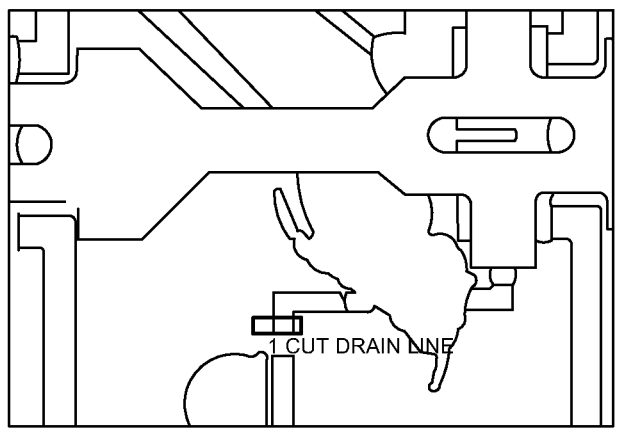
FIG. 37 illustrates foreign substance defects.
Figure 38:
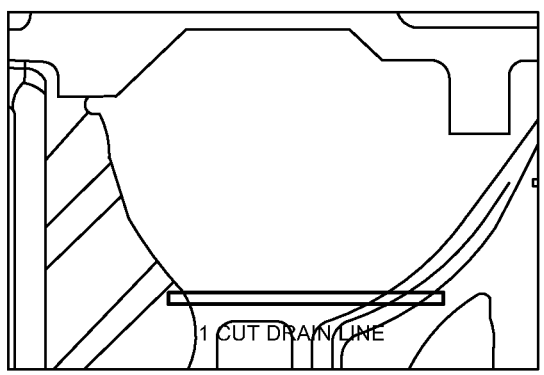
FIG. 38 illustrates a drain cut.

The system should accommodate different orientations, such as horizontal lines (see FIG. 35) and/or vertical lines (see FIG. 36), and transistor devices that are located generally at the different corners of the pixel and/or sub-pixel regions. In some cases, the system should also make cuts that avoid hitting other lines and defects, while avoiding foreign substance defects (see FIG. 37). The system may also make a drain cut length that is adapted to the width and/or length of the drain line in the input image (see FIG. 38). While performing these modifications, the cuts should be sufficiently close to the connection point of the defect, but should avoid touching the defect itself.

Figure 39:
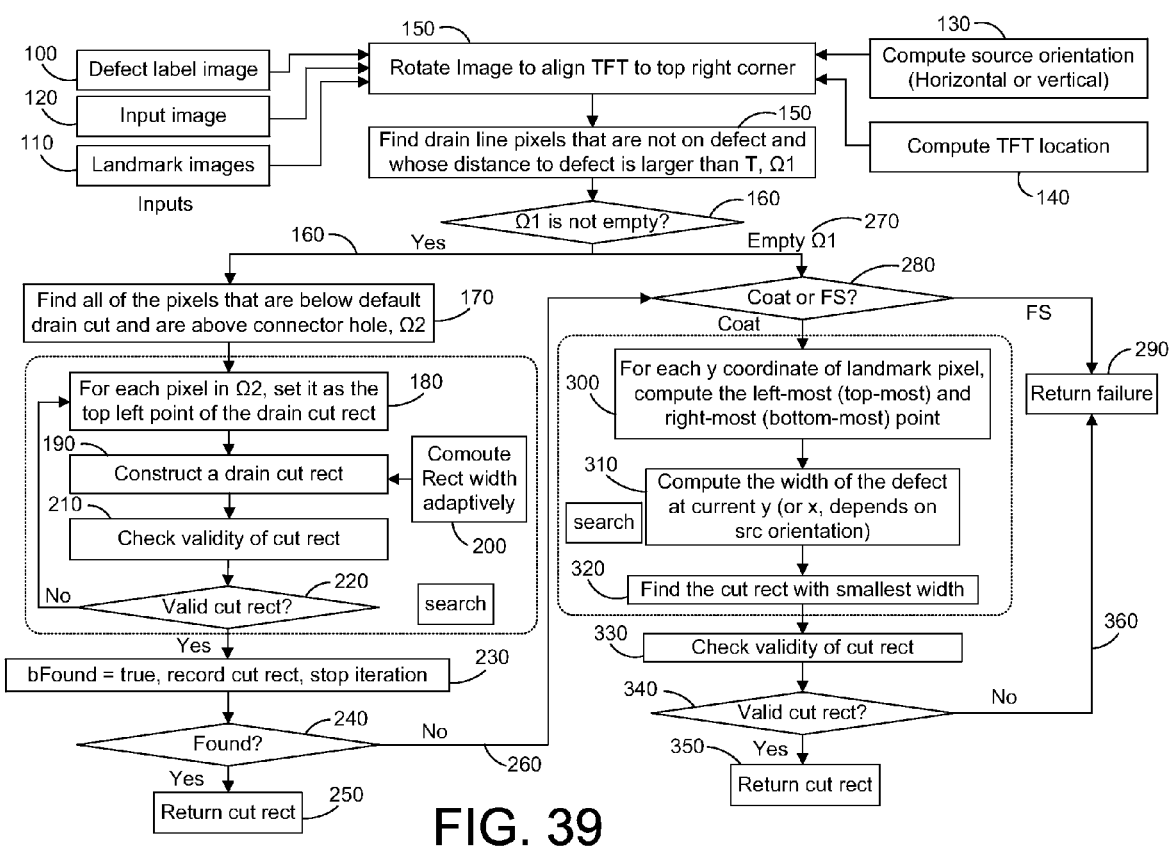
FIG. 39 illustrates an adjusted drain cut technique.

Referring to FIG. 39, one technique to make an adjusted drain cut is illustrated. A defect label image 100 may be received, which is generally a mask of where the potential defects are. A landmark images model 110 may be received which is generally a model image of lines and other structures of the device. An input image 120 of the actual device may likewise be received. With the input image 120 being received, the system may compute the orientation of the input image 130 and compute the location of the thin-film transistors 140. With the orientation and the location of the thin-film-transistors determined the system may rotate the image 120 to align it with the orientation of the defect label image 100. For example, the result may be to align the thin film transistors in the top right corner of each pixel.

Then the system may determine drain line pixels that are not on a defect and whose distance to a defect is larger than a threshold T for a set of pixels 150. If the set of pixels is not empty 150, thus only some are covered by a defect 160. Then the system may find all of the pixels that are below a default drain cut location and are above a connector 170. For each pixel meeting this criteria, set it as the top left point of the drain cut rectangle 180. A drain cut rectangular region is constructed 190, where the length and/or width of the drain cut region is adaptively modified 200. The suitability of the rectangular region may be checked 210, and if the drain cut rectangular region is not sufficient in size to achieve the desired effect 220, additional pixels may be characterized. A suitable rectangular region may be determined in an iterative manner, such as starting at a location closest to the defect and working toward the connection, because it is better to make a cut farther away from the connection. If a suitable rectangular region 230 is found 240, then that region is subsequently cut 250.

If a suitable rectangular region is not found 260, or the system determines drain line pixels are all covered by a defect 270, then it is likely that the entire region is covered. In the case of a coating defect or a foreign substance defect 280, the system may return a failure message 290 indicating that automatic repair is not suitable.

Otherwise for each y coordinate of a landmark pixel, compute the left-most (top-most) and right most (bottom most) point 300. Then the system may compute the width and/or length of the defect at the current y (or x, depending on the orientation) 310. Based upon this, the system may find the cut for a rectangle with the smallest width 320. The validity of the rectangle may be verified 330, and if a value cut 340 then the system may make the cut 350, otherwise the system may return a failure 360.

Figure 40:
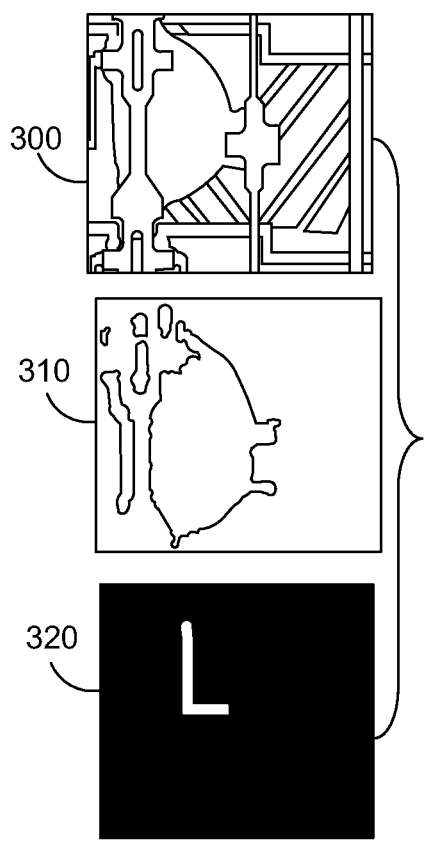
FIG. 40 illustrates input images.
Figure 41:
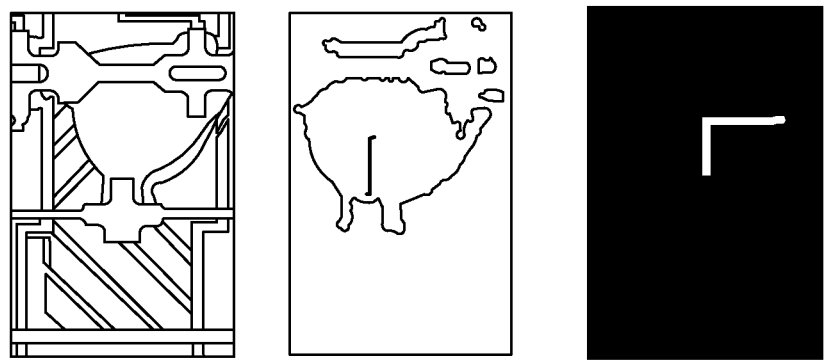
FIG. 41 illustrates aligned input images.
Figure 42:
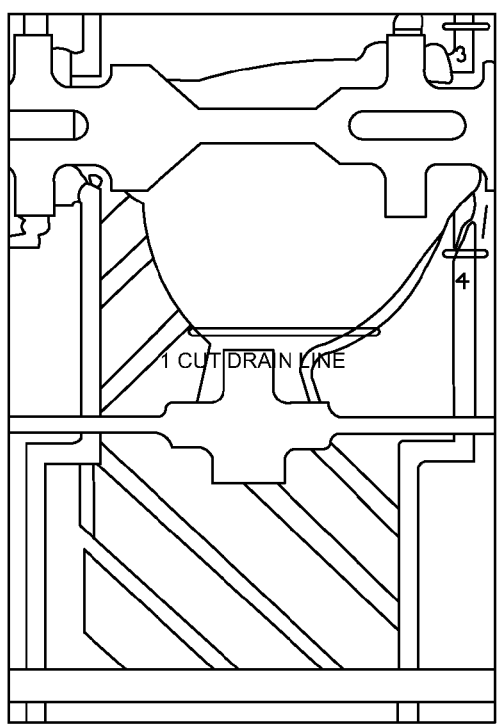
FIG. 42 illustrates drain line pixels that are not on a defect and have a distance to a defect larger than a threshold.

An exemplary adjusted drain cut technique is described and illustrated. Referring to FIG. 40, an input image 300 is received, a mask image 310 is received, and a landmark image 320 is received. Referring to FIG. 41, the three images 300, 310, 320 may be aligned in some manner so that the TFT areas are in the same position, such as aligning the TFT area into top right position by first locating TFT area and then rotating it to top right. Referring to FIG. 42, drain line pixels that are not on a defect and which have a distance to the defect larger than a threshold may be cut, preferably using a generally shortest length.

Figure 43:
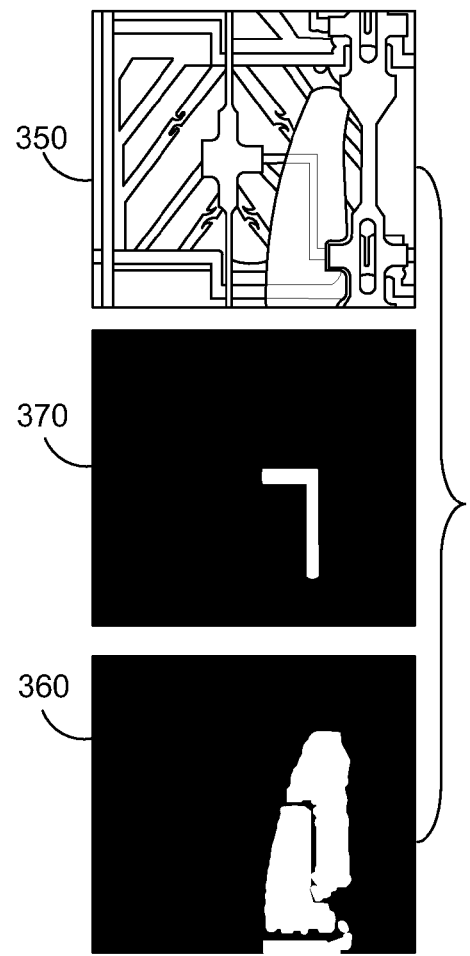
FIG. 43 illustrates input images.
Figure 44:
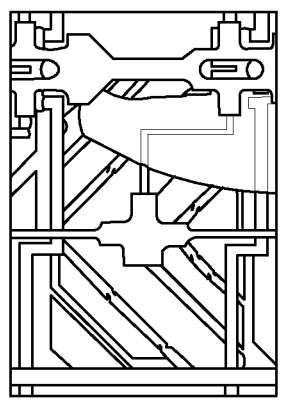
FIG. 44 illustrates aligned input images.
Figure 44:
Figure 44:
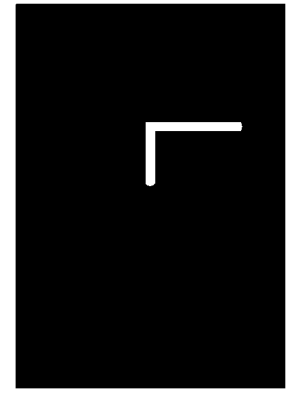
Figure 45:
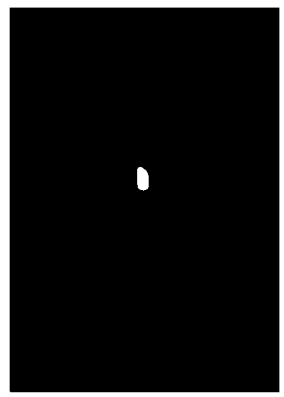
FIG. 45 illustrates drain lines not on a defect.
Figure 46:
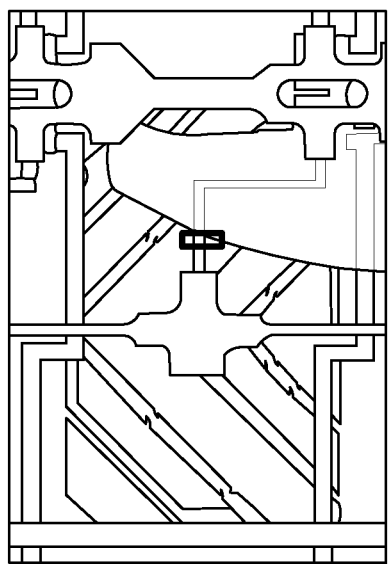
FIG. 46 illustrates a rectangular cut.
Figure 47:
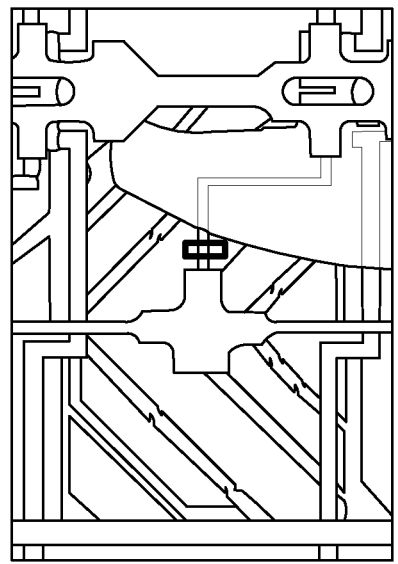
FIG. 47 illustrates a verified rectangular cut.

Another exemplary adjusted drain cut technique is described and illustrated. Referring to FIG. 43, an input image 350 is received, a mask image 360 is received, and a landmark image 370 is received. Referring to FIG. 44, the three images 350, 360, 370 may be aligned in some manner so that the TFT areas are in the same position, such as aligning the TFT area into top right position by first locating TFT area and then rotating it to top right. Referring to FIG. 45, drain line pixels that are not on a defect and which have a distance to the defect larger than a threshold are identified. Referring to FIG. 46, a verified rectangular cut is determined. Referring to FIG. 47, the rectangular region may be cut, preferably using a generally shortest length.

Figure 48:
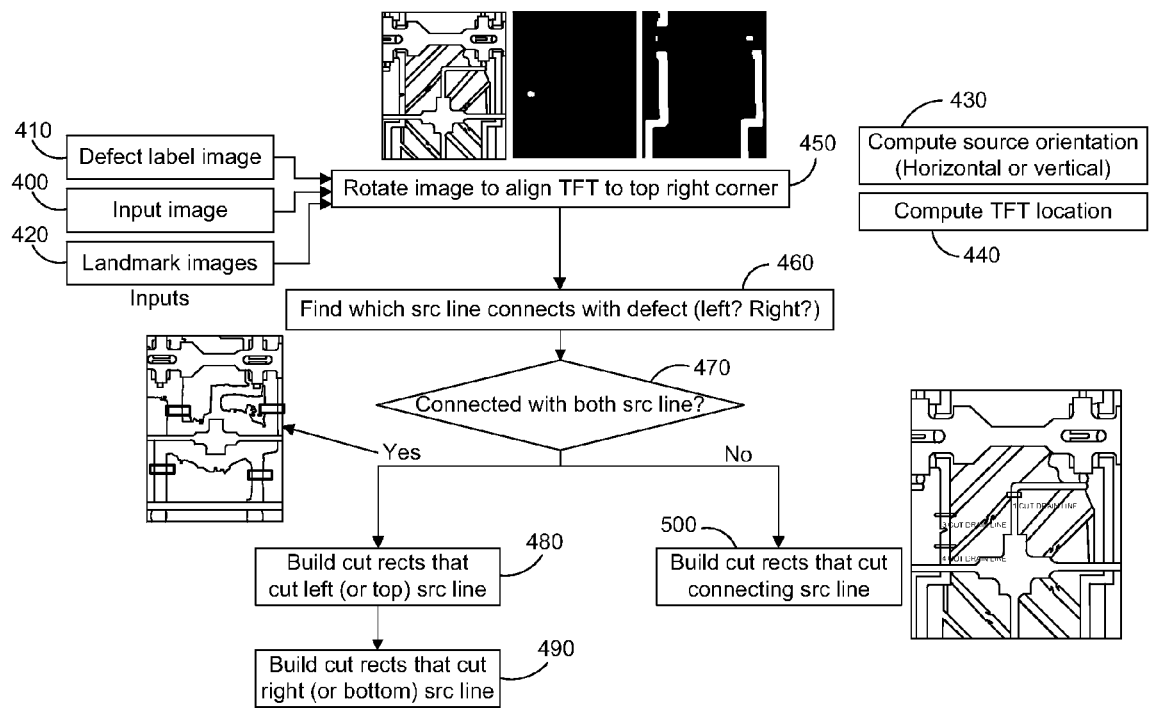
FIG. 48 illustrates a source cut technique.

An exemplary adjusted source cut technique is described and illustrated. Referring to FIG. 48, an input image 400 is received, a mask image (e.g., defect label image) 410 is received, and a landmark image 420 is received. The source orientation 430 of the images may be determined and the TFT locations 440 may be determined, so that the images may be rotated and aligned with one another 450. With the images being aligned, the system may determine which source lines connect with the defect 460, such as left source lines or right source lines. A determination is made if the right source line and the left source line are connected to the defect 470. In the case that the defect is connected to both source lines, a suitable rectangle is determined for the left source line (or top) 480 and a suitable rectangle is determined for the right source line (or bottom) 490. Thus a pair of rectangles may be used to make a suitable repair for a single defect. In the case that the defect is connected to one source line, a suitable rectangle is determined 500.

Figure 49:
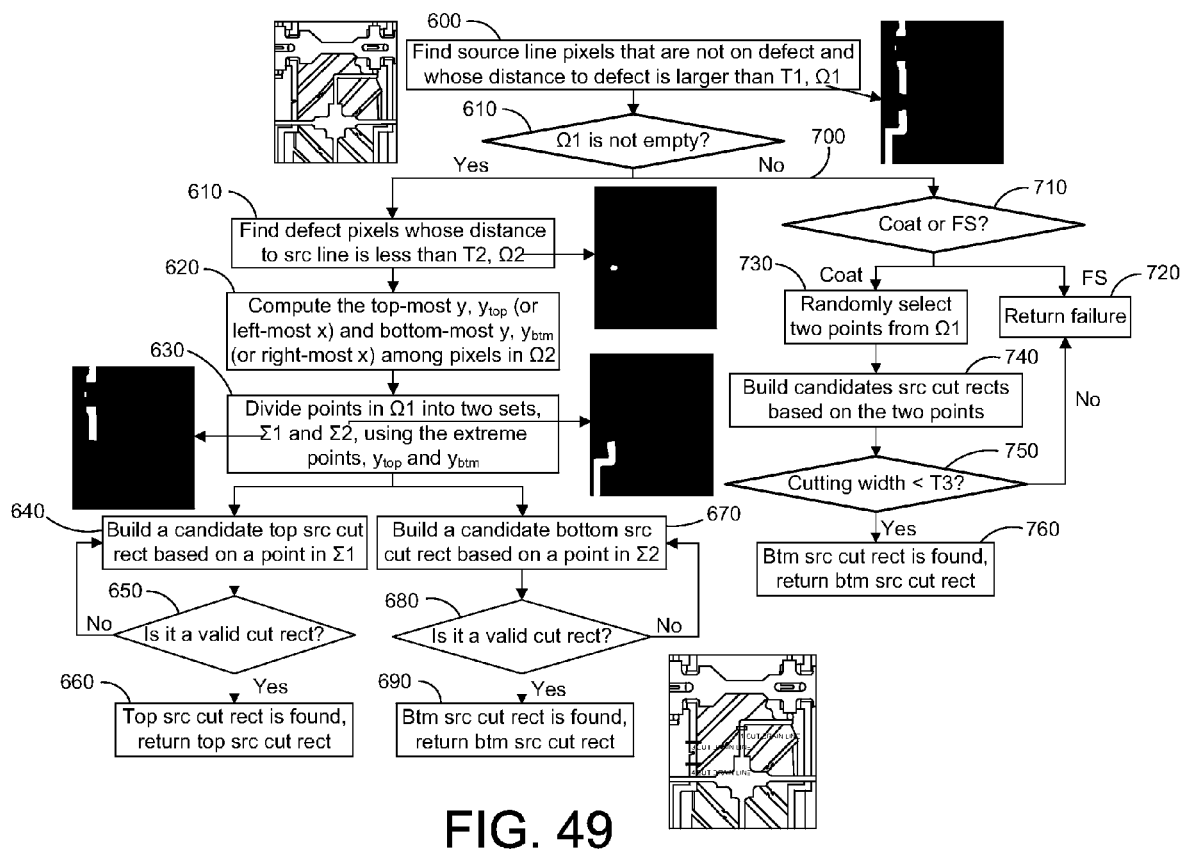
FIG. 49 illustrates another source cut technique.

Another exemplary adjusted source cut technique is described and illustrated. Referring to FIG. 49, based upon the source content, the system may determine source line pixels that are not on a defect and whose distance to a defect is larger than a threshold T1 Ω1 600. If such source line pixels exist Ω1 610, then the system may determine defect pixels whose distance to the source line is less than a second threshold T2 Ω2 610. The system may compute the top most y, $y_{top}$ (or left most x) and bottom-most y, $y_{btm}$ (or right most x) among the pixels in Ω2 620. The system may also divide point in Ω1 into two sets, Σ1 and Σ2, based upon the extreme point $y_{top}$ and $y_{btm}$ 630. For the top candidate source line a cut rectangle is determined based upon a point in Σ1 640. The system determines if it is a valid cut 650, and when a valid cut is determined the system makes the cut 660. For the bottom candidate source line a cut rectangle is determined based upon a point in Σ2 670. The system determines if it is a valid cut 680, and when a valid cut is determined the system makes the cut 690.

If such source line pixels do not exist Ω1 700, then the system may determine if the defect is a coat type defect of a foreign substance type defect 710. In the case of a foreign substance type defect a failure is indicated 720. In the case of a coat type defect, the system may randomly select two points from Ω1 730. A candidate source cut rectangle may be constructed based upon the two point 740. If the cutting width is less than a threshold T3 750, then the system may make the cut 760.

Figure 50:
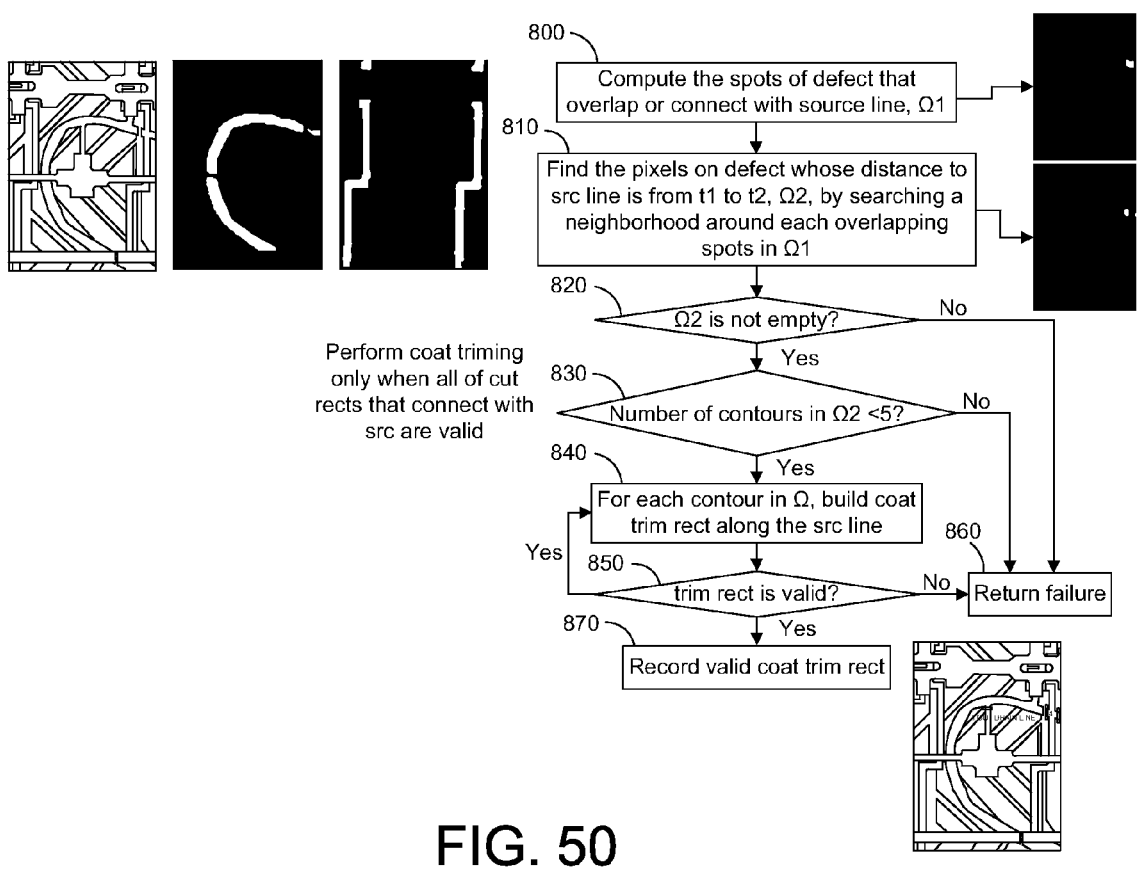
FIG. 50 illustrates a coat trimming technique.

An exemplary coat trimming technique is described and illustrated. Referring to FIG. 50, the system may compute the spots (e.g., regions) of the defect that overlaps or connects with a source line Ω1 800. The system then determines the pixels on defects whose distance to the source line is from t1 to t2, Ω2, by searching a neighborhood around each of the overlapping spots in Ω1 810. If Ω2 is empty 820, then a failure is indicated 860. If Ω2 is not empty 820 then the system determines if the number of contours in Ω2 is less than a threshold, such as 5 830. If Ω2 is greater than a threshold 820 a failure is indicated 860. Then the system determines for each contour in Ω2, build a coat trim rectangle along the source line 840. If the rectangle is value 850 is not value another rectangle is determined. When a valid rectangle is determined the system may make the cut 870.

In some cases, the defect may include multiple types of defects, such a coating type defect, a drain type defect, a source type defect, and a gate type defect. In this case, the cut should be selected such that it takes into account the multiple types of defects, and makes an appropriate number of cuts. Preferably, the selected cuts result in a minimum number of cuts at least two of which are in different directions. For example, a bounding rectangle may be determined around the defect, and then compute a plurality of cuts that effectively disables the defect. For example, in many cases the cut lines may be of different lengths and oriented at a perpendicular orientation with respect to one another.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A method for identifying a defect in a liquid crystal device comprising:
    (a) receiving an input image of a portion of said liquid crystal device;
    (b) receiving a defect-free model image of said liquid crystal device, said defect free model image including manually appended landmark labels that identify respective types of landmark structures of said model image; and
    (c) identifying a defect, a defect position and a defect size based on identification of a color of an irregularly-shaped region associated with said defect, using said defect-free model image, said landmark labels, and input image.

2. The method of claim 1 wherein a mask image reduces the effects of color patterns in said input image not associated with said defect.

3. The method of claim 1 wherein a mask image reduces the effects of bubbles in said input image not associated with said defect.

4. The method of claim 2 wherein said mask image is based upon a pair of primary colors.

* * * * *